(12) United States Patent
Nishiwaki et al.

(10) Patent No.: US 10,486,220 B2
(45) Date of Patent: Nov. 26, 2019

(54) CAULKING DIE, CAULKING TOOL, METHOD FOR MANUFACTURING CAULKING JOINT USING THEM

(71) Applicant: NITTA CORPORATION, Osaka (JP)

(72) Inventors: Shunichi Nishiwaki, Mie (JP); Koji Naka, Mie (JP); Mitsuhiro Okada, Mie (JP)

(73) Assignee: NITTA CORPORATION, Osaka (JP)

( * ) Notice: Subject to any disclaimer, the term of this patent is extended or adjusted under 35 U.S.C. 154(b) by 0 days.

(21) Appl. No.: 15/416,392

(22) Filed: Jan. 26, 2017

(65) Prior Publication Data

US 2017/0211728 A1    Jul. 27, 2017

(30) Foreign Application Priority Data

Jan. 27, 2016   (JP) .................................. 2016-013311

(51) Int. Cl.
| | | |
|---|---|---|
| *B21D 39/04* | (2006.01) | |
| *F16L 33/207* | (2006.01) | |
| *F16L 13/12* | (2006.01) | |

(52) U.S. Cl.
CPC .......... *B21D 39/048* (2013.01); *B21D 39/046* (2013.01); *F16L 13/128* (2013.01); *F16L 33/2076* (2013.01)

(58) Field of Classification Search
CPC ... B21D 39/048; B21D 39/03; F16L 33/2076; F16L 13/128

(Continued)

(56) References Cited

U.S. PATENT DOCUMENTS

| 3,176,495 A | * | 4/1965 | Zane | ..................... F16L 13/128 |
| | | | | 72/402 |
| 4,498,691 A | * | 2/1985 | Cooke | ................. F16L 33/2076 |
| | | | | 285/12 |

(Continued)

FOREIGN PATENT DOCUMENTS

| JP | S6238594 A | 2/1987 |
| JP | H10122450 A | 5/1998 |

(Continued)

OTHER PUBLICATIONS

English Abstract for JP2015160236, Publication Date: Sep. 7, 2015.

(Continued)

*Primary Examiner* — Sean K. Hunter
*Assistant Examiner* — Seahee Yoon
(74) *Attorney, Agent, or Firm* — Millen, White, Zelano & Branigan, P.C.; William Nixon (57) ABSTRACT

A caulking die according to an embodiment of the present invention includes an end surface being connected to each of an upper surface and a lower surface. The end surface includes a first protruded part including a first top portion, a recessed groove, and a second protruded part including a second top portion in sequential order from the lower surface side toward the upper surface side. A length of the second top portion is larger than a length of the first top portion, and a height of the second protruded part is larger than a height of the first protruded part in a cross-sectional view perpendicular to a width direction of the end surface. A caulking tool includes the caulking die. A method for manufacturing a caulking joint uses the caulking tool.

18 Claims, 10 Drawing Sheets

(58) Field of Classification Search
USPC .............. 72/402; 285/256, 351; 29/237, 235
See application file for complete search history.

(56) References Cited

U.S. PATENT DOCUMENTS

| | | | | |
|---|---|---|---|---|
| 4,804,212 A * | 2/1989 | Vyse | ...................... | B21D 39/04 285/256 |
| 5,253,506 A * | 10/1993 | Davis | ................... | B21D 39/048 72/402 |
| 5,257,525 A * | 11/1993 | Clarke | ................. | B21D 39/046 29/237 |
| 5,335,530 A * | 8/1994 | Homm | ................... | B21D 39/04 72/402 |
| 5,353,623 A * | 10/1994 | Bobenhausen | ...... | B21D 39/048 29/237 |
| 5,720,197 A * | 2/1998 | Grau | ................... | B21D 39/048 72/402 |
| 6,324,884 B1 * | 12/2001 | Barjesteh | ............. | B21D 39/046 29/237 |
| 6,484,552 B1 * | 11/2002 | Bernas | ................. | B21D 39/048 29/237 |
| 7,624,504 B2 * | 12/2009 | Watanabe | ........... | F16L 33/2073 285/256 |
| 8,336,177 B2 * | 12/2012 | Vernasca | .............. | B21D 39/048 29/235 |
| 9,586,253 B1 * | 3/2017 | Jensen | ................. | B21D 39/048 |

FOREIGN PATENT DOCUMENTS

| | | |
|---|---|---|
| JP | H1182843 A | 3/1999 |
| JP | 2015160236 A | 9/2015 |

OTHER PUBLICATIONS

English Abstract for JPH1182843, Publication Date: Mar. 26, 1999.
English Abstract for JPH10122450, Publication Date: May 15, 1998.
English Abstract of JPS6238594, Publication Date: Feb. 19, 1987.

* cited by examiner

CAULKING DIE, CAULKING TOOL, METHOD FOR MANUFACTURING CAULKING JOINT USING THEM

TECHNICAL FIELD

The present invention relates to a caulking die, a caulking tool, and a method for manufacturing a caulking joint by using them.

BACKGROUND ART

A caulking joint (hose joint) as being a piping member is used for a transfer of a fluid, such as oil used for hydraulic machinery (refer to, for example, Patent Documents 1 to 4). The caulking joint used for the hydraulic machinery is often manufactured by caulking in eight directions with the use of a caulking tool provided with caulking dies.

Meanwhile the fluid passes through a pipe used for the hydraulic machinery or the like at high pressure, and therefore the caulking joint is also subjected to the high pressure. When manufacturing a caulking joint for high pressure that is durable under the high pressure, in order to inhibit leakage of the fluid or the like, it is necessary to ensure that a caulking width is increased by caulking over a wide range and a caulking rate is enhanced by tight caulking.

However, when caulking under the above conditions by using a conventional caulking tool, there has been the problem that a nipple as a component for sealing the fluid and inhibiting hose slippage is susceptible to deformation (buckling), thus leading to deterioration of physical properties of the joint, such as sealing properties.

PRIOR ART DOCUMENT

Patent Documents

Patent Document 1: Japanese Unexamined Patent Publication No. 10-122450;
Patent Document 2: Japanese Unexamined Patent Publication No. 11-082843;
Patent Document 3: Japanese Unexamined Patent Publication No. 2015-160236; and
Patent Document 4: Japanese Examined Patent Publication No. 62-038594

SUMMARY OF THE INVENTION

Problems to be Solved by the Invention

An object of the present invention is to provide a caulking die and a caulking tool, which make it possible to reduce the amount of deformation of the nipple when manufacturing a caulking joint for high pressure, as well as a method for manufacturing the caulking joint by using them.

Means for Solving the Problems

A caulking die according to an embodiment of the present invention includes an upper surface, a lower surface, and an end surface being connected to each of the upper surface and the lower surface. The end surface includes a first protruded part including a first top portion, a recessed groove, and a second protruded part including a second top portion in sequential order from the lower surface side toward the upper surface side. The first protruded part, the recessed groove, and the second protruded part extend along a width direction of the end surface. A length of the second top portion is larger than a length of the first top portion, and a height of the second protruded part on a basis of the end surface is larger than a height of the first protruded part on the basis of the end surface in a cross-sectional view perpendicular to the width direction.

A caulking tool according to an embodiment of the present invention includes a plurality of the caulking dies according to the above embodiment, and a main body configured to attach the caulking dies thereto. Each of the caulking dies is attached to the main body in a state of being capable of moving the end surface in a caulking direction.

A method for manufacturing a caulking joint according to an embodiment of the present invention includes overlapping a tubular socket of a joint part onto one end portion of a hose, and then inserting a nipple of the joint part from a hose aperture at the one end portion of the hose into the hose, and caulk-fixing the one end portion of the hose to the nipple by externally caulking the socket by the caulking tool according to the above embodiment.

Effects of the Invention

With the caulking die according to the embodiment of the present invention, it is possible to reduce the amount of deformation of the nipple when manufacturing a caulking joint for high pressure. The manufactured caulking joint is therefore capable of exerting excellent sealing properties or the like.

EMBODIMENTS FOR CARRYING OUT THE INVENTION

<Caulking Die>
(First Embodiment)
A caulking die (hereinafter also referred to as "die") according to a first embodiment of the present invention is described in detail below with reference to FIGS. 1 and 2.

Figure 1A:
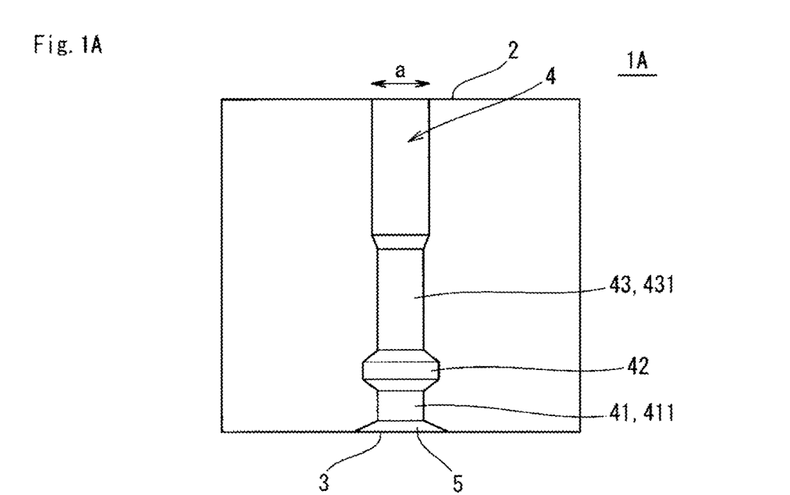
FIG. 1A is a front view of a caulking die according to a first embodiment of the present invention.
Figure 1B:
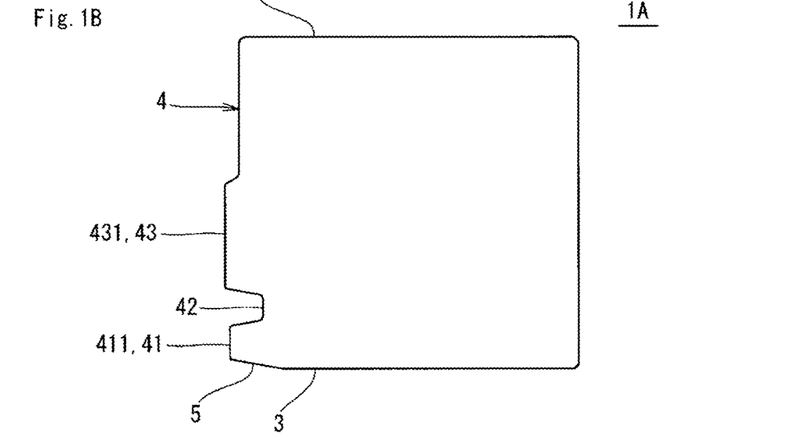
FIG. 1B is a side view thereof.
Figure 1C:
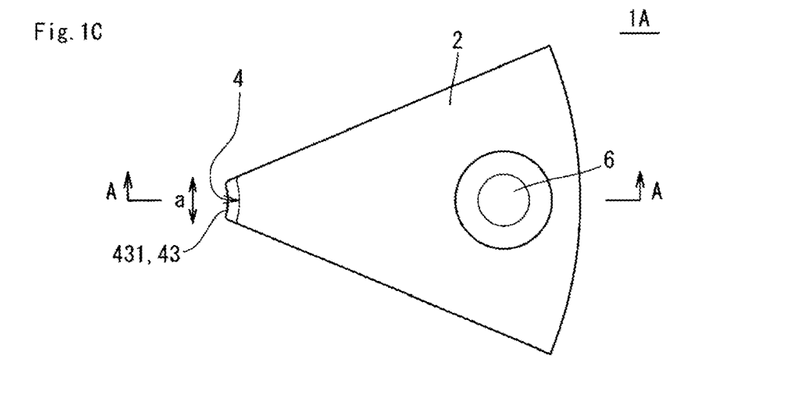
FIG. 1C is a plan view thereof.

As shown in FIG. 1, the die 1A of the present embodiment includes an upper surface 2, a lower surface 3, and an end surface 4 being connected to each of the upper surface 2 and the lower surface 3.

The end surface 4 is a portion configured to press a socket 202 that is a caulking member described later (refer to FIG. 8). As shown in FIG. 1, the end surface 4 includes a first protruded part 41, a recessed groove 42, and a second protruded part 43 in sequential order from the lower surface 3 side toward the upper surface 2 side. As shown in FIG. 1A, all of the first protruded part 41, the recessed groove 42, and the second protruded part 43 extend along a width direction "a" of the end surface 4. These configurations produce the following effects.

To be specific, a socket 202 can be caulked by causing the first protruded part 41 and the second protruded part 43 to bite into the socket 202. A part of the socket 202 being deformed by the biting of the first protruded part 41 and the second protruded part 43 therein can be guided into the recessed groove 42 located between the first protruded part 41 and the second protruded part 43. It is therefore possible to cause the recessed groove 42 to function as an escape allowance of the deformed socket 202. Accordingly, the above configuration makes it possible for the socket 202 to be surely caulked by the first protruded part 41 and the second protruded part 43 while guiding the part of the deformed socket 202 into the recessed groove 42. It is consequently possible to cause the die 1A to function as a two-stage caulking die having excellent caulking performance.

Here, the first protruded part 41 includes a first top portion 411. The second protruded part 43 includes a second top portion 431. The die 1A has the following configurations (I) and (II) in a cross-sectional view perpendicular to the width direction "a" shown in FIG. 2.

Figure 2A:
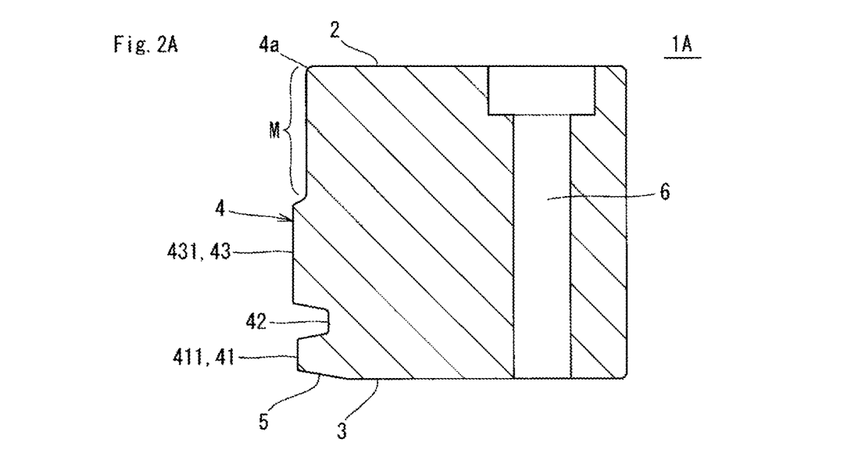
FIG. 2A is a sectional view of the caulking die shown in FIG. 1, taken along line A-A in FIG. 1C.
Figure 2B:
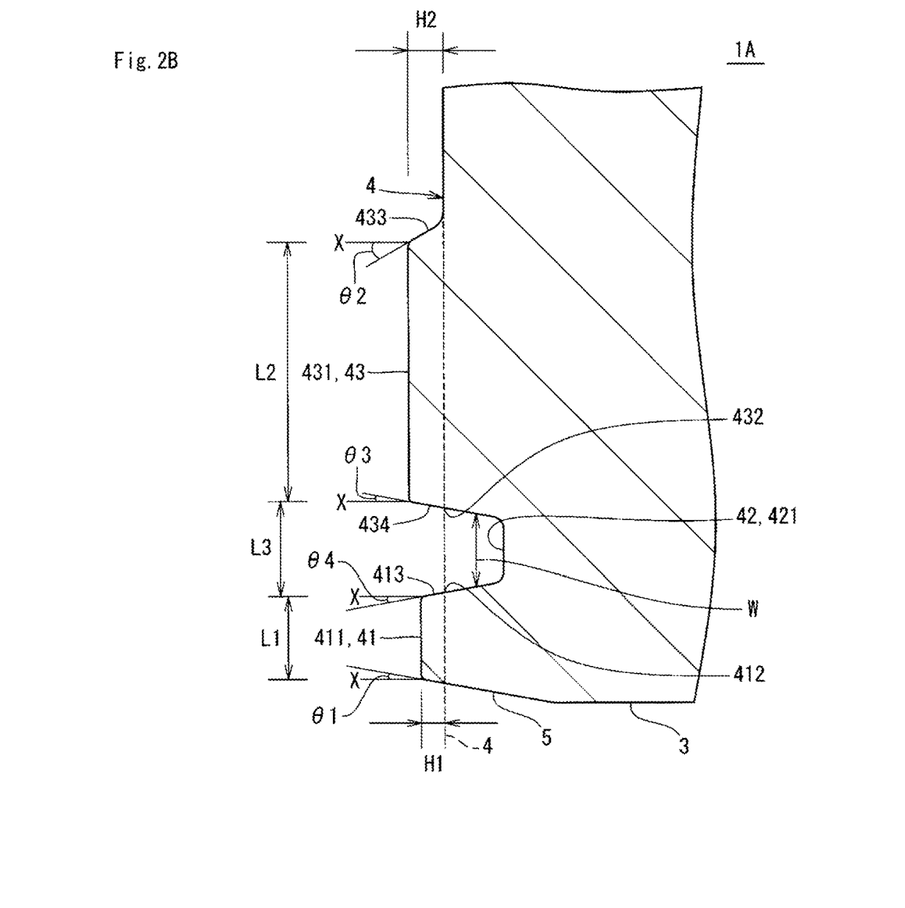
FIG. 2B is a partial enlarged sectional view of FIG. 2A.

(I) A length L2 of the second top portion 431 is larger than a length L1 of the first top portion 411 as shown in FIG. 2B.

(II) A height H2 of the second protruded part 43 is larger than a height H1 of the first protruded part 41 as shown in FIG. 2B. The heights H1 and H2 are the heights on the basis of the end surface 4.

The above configurations produce the following effects. Each of the length L1 of the first top portion 411 and the length L2 of the second top portion 431 corresponds to a caulking width of the die 1A. Each of the height H1 of the first protruded part 41 and the height H2 of the second protruded part 43 corresponds to a caulking rate (caulking diameter) of the die 1A. Therefore, with the above configurations, the first protruded part 41 has relatively smaller caulking width and lower caulking rate than the second protruded part 43. The second protruded part 43 has relatively larger caulking width and higher caulking rate than the first protruded part 41. A caulking rate necessary for manufacturing the caulking joint for high pressure can be ensured by the second protruded part 43 having the relatively higher caulking rate, while ensuring a caulking width necessary for manufacturing the caulking joint for high pressure by the first protruded part 41 and the second protruded part 43. Additionally, the first protruded part 41 has the relatively smaller caulking width and lower caulking rate as described above, and is therefore capable of reducing load applied to a part of a nipple 203 described later which is configured to be caulked by the first protruded part 41 (refer to FIG. 8). It is consequently possible to reduce the amount of deformation of the nipple when manufacturing the caulking joint for high pressure. The die 1A is preferably used, for example, in a state in which the first protruded part 41 is located closer to a hose aperture 205B described later than the second protruded part 43 (refer to FIG. 8).

As shown in FIG. 2B, the length L2 of the second top portion 431 is preferably 1.5-5.0 times the length L1 of the first top portion 411. For example, the length L1 of the first top portion 411 is 3.0-4.5 mm, and the length L2 of the second top portion 431 is 4.5-22.5 mm. The length L2 of the second top portion 431 is preferably set larger than the length L1 of the first top portion 411 within the numerical range as exemplified above. The caulking width of the die 1A is a total value of the length L1 of the first top portion 411 and the length L2 of the second top portion 431. The caulking width is preferably 7.5-27.0 mm. The length L1 of the first top portion 411 and the length L2 of the second top portion 431 are not limited to the exemplified numerical ranges, respectively. The first top portion 411 and the second top portion 431 have a planar form.

The height H2 of the second protruded part 43 is preferably 1.1-2.0 times the height H1 of the first protruded part 41. For example, the height H1 of the first protruded part 41 is 0.8-1.2 mm, and the height H2 of the second protruded part 43 is 0.9-2.4 mm. The height H2 of the second protruded part 43 is preferably set larger than the height H1 of the first protruded part 41 within the numerical range as exemplified above. The height H1 of the first protruded part 41 and the height H2 of the second protruded part 43 are not limited to the exemplified numerical ranges, respectively.

The caulking rate of the die 1A is preferably 25-45%. The caulking rate is a value calculated from the following formula: $[(T1-T2)/T1] \times 100$, where T1 is a wall thickness of the hose before caulking, and T2 is a wall thickness of the hose after caulking. Here, T2 that is the wall thickness of the hose after caulking is a value calculated from the following formula: (Caulking diameter/2)−Wall thickness of socket−(Outer diameter of nipple/2). The caulking diameter is an inner diameter formed by the second protruded part 43 when caulking with the die 1A (refer to FIGS. 7 and 8). The caulking rate of the die 1A is not limited to the exemplified numerical range.

In the present embodiment, the first protruded part 41 has a trapezoidal form in the cross-sectional view shown in FIG. 2. With this configuration, it is possible to improve strength of the first top portion 411 by increasing thickness of circumferences of an edge of the first to portion 411, thereby suppressing the first protruded part 41 from being fractured during the caulking.

The length L1 of the first top portion 411 is smaller than a length L3 between the first top portion 411 and the second top portion 431 in the cross-sectional view. With this configuration, the length L1 of the first top portion 411 becomes relatively small, thus making it easier for the first protruded part 41 to bite into the socket 202. The length L3 between the first top portion 411 and the second top portion 431 becomes relatively large, thus making it easier for the part of the socket 202 being deformed by the biting of the first protruded part 41 therein to be guided into the recessed groove 42.

The die 1A further includes an inclined part 5 located from the first top portion 411 to a part of the lower surface 3. This configuration makes it easier for the first protruded part 41 to bite into the socket 202.

An inclination angle θ1 of the inclined part 5 is an acute angle as shown in FIG. 2B. This configuration makes it possible to improve the effects obtainable from the inclined part 5. The inclination angle θ1 is 10° in the present embodiment, but is not limited thereto. The inclination angle θ1 is an angle with respect to a reference line X perpendicular to the end surface 4 in the cross-sectional view. This is also true for other inclination angles θ2 to θ4 described later.

The recessed groove 42 is continuous with each of an basal end portion 412 of the first protruded part 41 and a basal end portion 432 of the second protruded part 43. This configuration ensures that each of the first protruded part 41 and the second protruded part 43 is continuous with the recessed groove 42. Accordingly, the part of the socket 202 being deformed by the biting of the first protruded part 41 and the second protruded part 43 therein can be smoothly guided into the recessed groove 42.

A groove width W of the recessed groove 42 decreases toward a bottom part 421 of the recessed groove 42. This configuration makes it easier for the part of the deformed socket 202 to be pulled into the recessed groove 42, thereby making it possible to smoothly guide the part of the deformed socket 202 into the recessed groove 42.

The second protruded part 43 has a trapezoidal form in the cross-sectional view. Similarly to the first protruded part 41, this configuration makes it possible to improve strength of the second protruded part 43 by increasing thickness of circumferences of an edge of the second top portion 431, thereby suppressing the second protruded part 43 from being fractured during the caulking.

The second protruded part 43 is located away from an upper end 4a of the end surface 4 located close to the upper surface 2 by interposing a clearance M between the second protruded part 43 and the upper end 4a as shown in FIG. 2A. With this configuration, the part of the socket 202 deformed by the biting of the second protruded part 43 therein can be shifted to the clearance M.

The second protruded part 43 further includes a second upper wall portion 433 located close to the upper surface 2, and a second lower wall portion 434 located close to the lower surface 3 as shown in FIG. 2B. An inclination angle θ2 of the second upper wall portion 433 is larger than an inclination angle θ3 of the second lower wall portion 434 in the cross-sectional view. With this configuration, the strength of the second protruded part 43 can be ensured by the second upper wall portion 433 whose inclination angle is relatively large, thereby suppressing the second protruded part 43 from being fractured during the caulking. Additionally, the part of the socket 202 deformed by the biting of the second protruded part 43 therein can be quickly shifted to the clearance M along the second upper wall portion 433 whose inclination angle is relatively large. Further, the second lower wall portion 434 whose inclination angle is relatively small makes it easier for the second lower wall portion 434 of the second protruded part 43 to bite into the socket 202. Furthermore, the second lower wall portion 434 of the second protruded part 43 is adjacent to the recessed groove 42, thus making it possible to smoothly guide the part of the deformed socket 202 into the recessed groove 42. In the present embodiment, the inclination angle θ2 is 30° and the inclination angle θ3 is 10°, without being limited thereto.

The first protruded part 41 further includes a first upper side wall portion 413 located close to the upper surface 2. In the present embodiment, an inclination angle θ4 of the first upper wall portion 413 is identical with the inclination angle θ3 of the second lower wall portion 434 in the cross-sectional view. With this configuration, the part of the socket 202 deformed by the biting of the first protruded part 41 and the second protruded part 43 therein can be guided into the recessed groove 42 in a well-balanced manner. Here, the description that the inclination angle θ4 is identical with the inclination angle θ3 denotes that both values need to be substantially the same and there may be a slight difference between both values as long as effects thereof are obtainable. Similarly to the inclination angle θ3, the inclination angle θ4 of the present embodiment is 10° without being limited thereto.

Figure 7A:
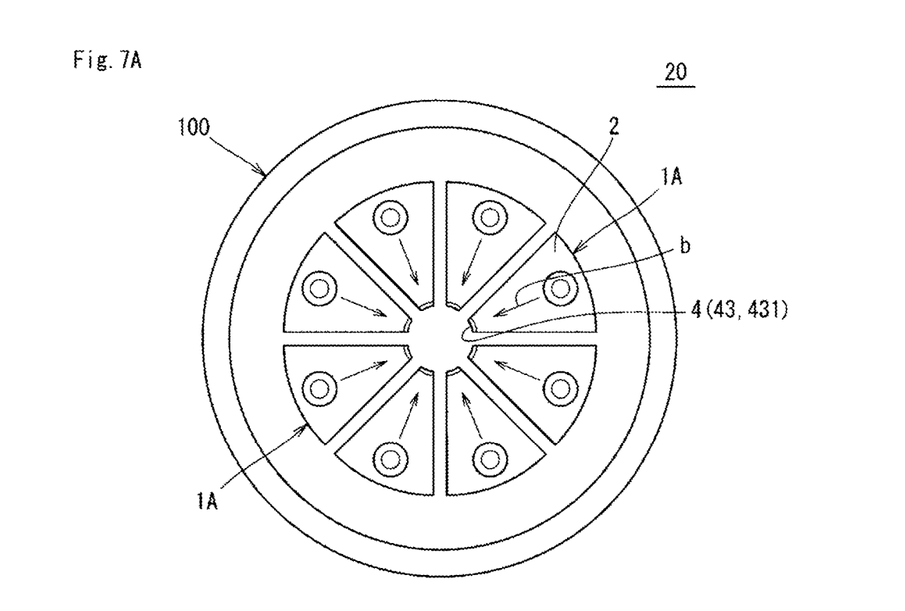
FIGS. 7A and 7B are schematic explanatory drawings that show a caulking tool according to an embodiment of the present invention.
Figure 7B:
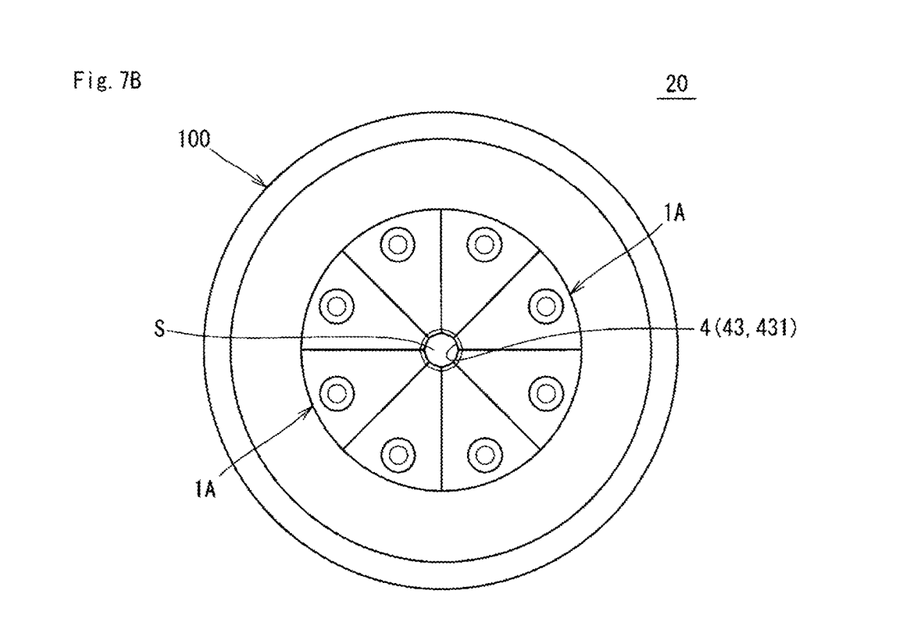

The die 1A of the present embodiment including the foregoing configurations further includes a through hole 6 extending between the upper surface 2 and the lower surface 3 as shown in FIG. 2A. The die 1A is configured to be attached via the through hole 6 to the main body 100 of a caulking tool 20 described later (refer to FIG. 7).

The end surface 4 has an inward protruding circular arc form in a top view shown in FIG. 1C. The term "top view" denotes a state in which the die 1A is viewed from the upper surface 2. The term "inward" denotes a direction toward the through hole 6.

(Second Embodiment)

Figure 3A:
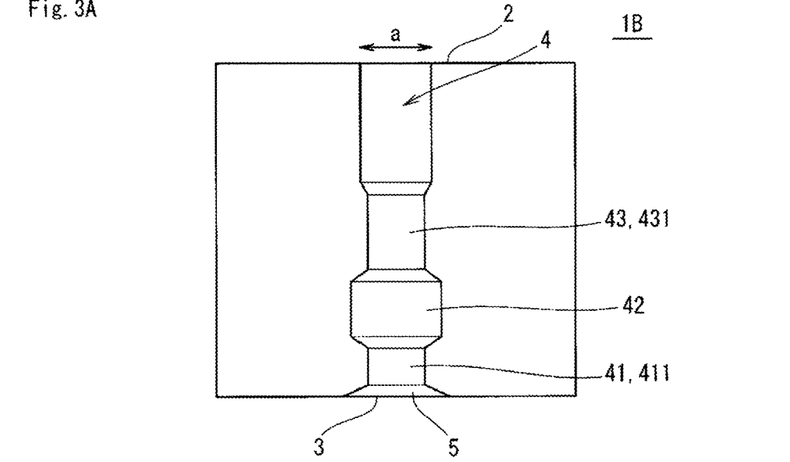
FIG. 3A is a front view of a caulking die according to a second embodiment of the present invention.
Figure 3B:
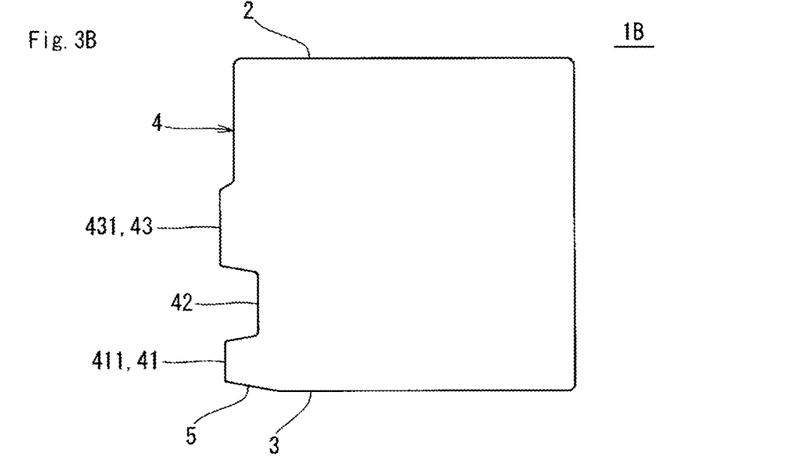
FIG. 3B is a side view thereof.
Figure 3C:
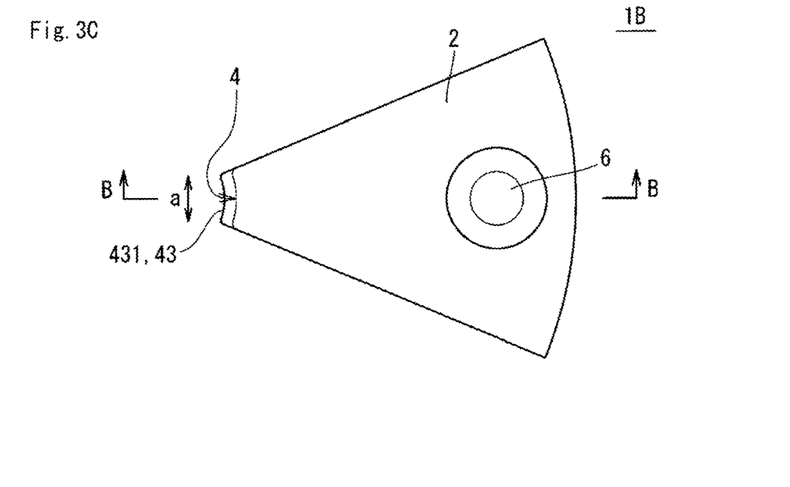
FIG. 3C is a plan view thereof.
Figure 4A:
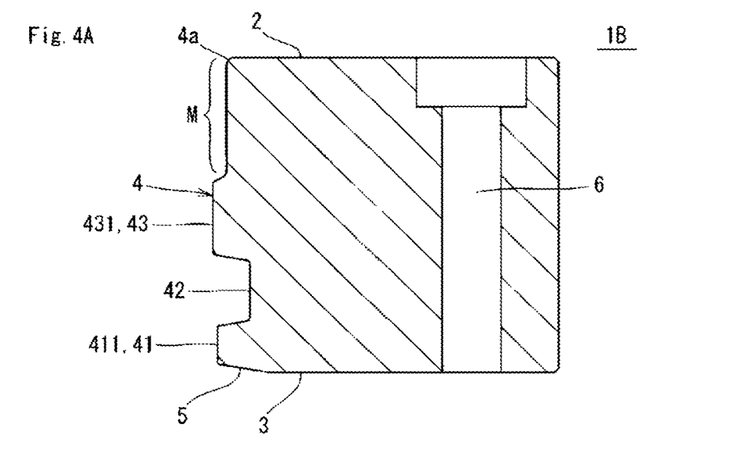
FIG. 4A is a sectional view of the caulking die shown in FIG. 3, taken along line B-B in FIG. 3C.
Figure 4B:
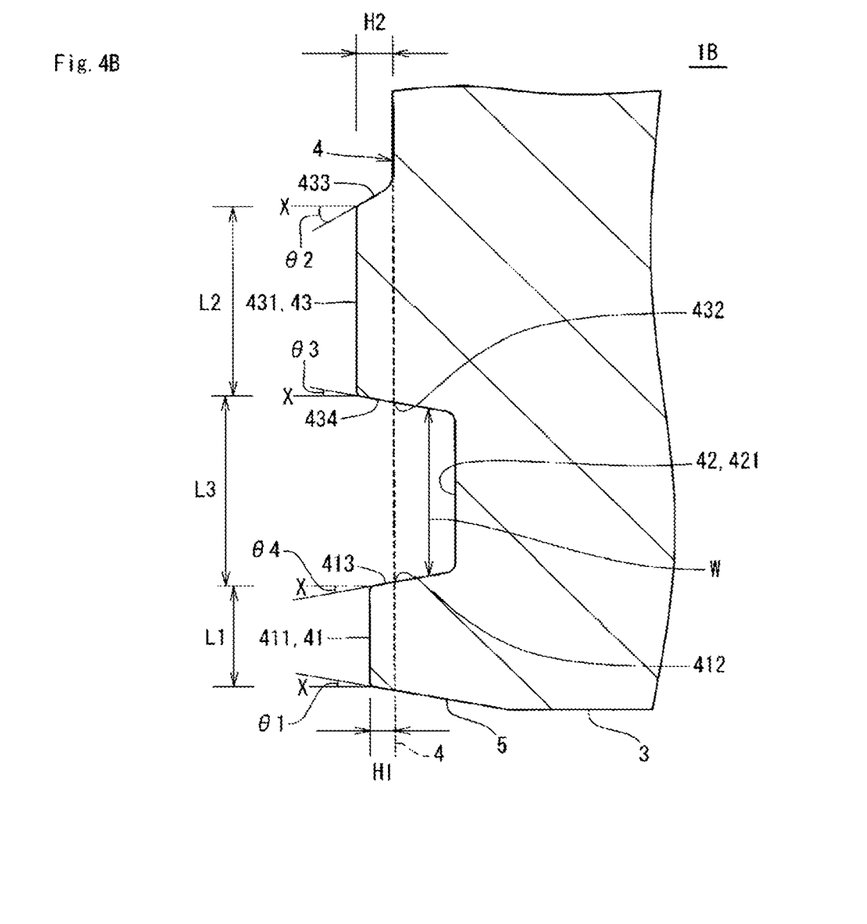
FIG. 4B is a partial enlarged sectional view of FIG. 4A.

A die according to a second embodiment of the present invention is described in detail below with reference to FIGS. 3 and 4. In FIGS. 3 and 4, the same reference numerals have been used as in FIGS. 1 and 2 for the same components and, in some cases, descriptions thereof are omitted.

The die 1B of the present embodiment shown in FIGS. 3 and 4 is different from the first embodiment in a relationship between the length L2 of the second top portion 431 and the length L3 between the first top portion 411 and the second top portion 431. Specifically, in the die 1A of the first embodiment, the length L2 of the second top portion 431 is larger than the length L3 between the first top portion 411 and the second top portion 431 in the cross-sectional view shown in FIG. 2B. Whereas in the die 1B of the present embodiment, the length L2 of the second top portion 431 is identical with the length L3 between the first top portion 411 and the second top portion 431 in the cross-sectional view shown in FIG. 4B. With this configuration, the second protruded part 43 and the recessed groove 42 are capable of functioning in a well-balanced manner. It is consequently possible to further reduce the amount of deformation of the nipple when manufacturing the caulking joint for high pressure. The description that the length L2 is identical with the length L3 denotes that both values need to be substantially the same and there may be a slight difference between both values as long as effects thereof are obtainable.

Other configurations are similar to those in the die 1A according to the first embodiment, and therefore descriptions thereof are omitted.

(Third Embodiment)

Figure 5A:
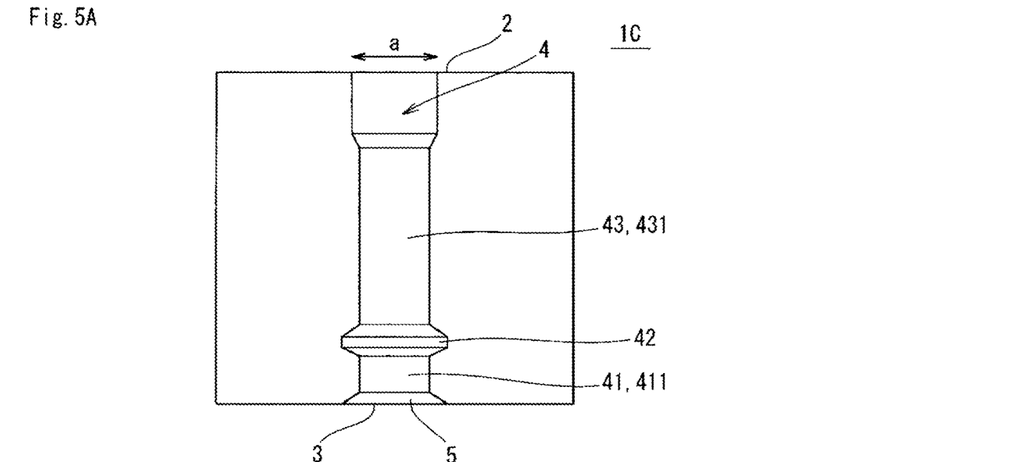
FIG. 5A is a front view of a caulking die according to a third embodiment of the present invention.
Figure 5B:
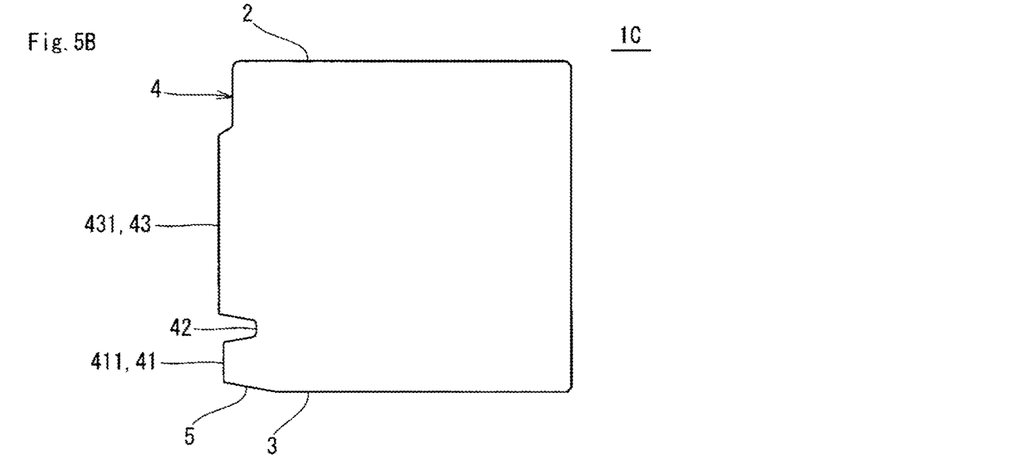
FIG. 5B is a side view thereof.
Figure 5C:
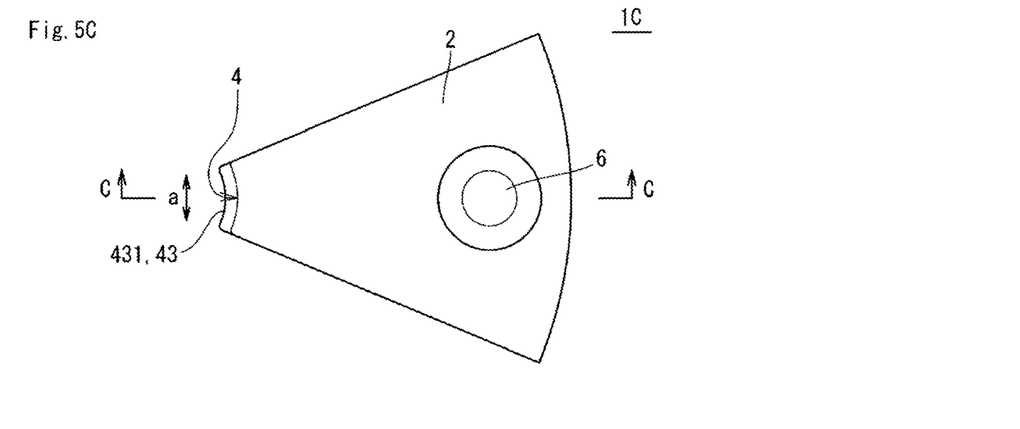
FIG. 5C is a plan view thereof.
Figure 6A:
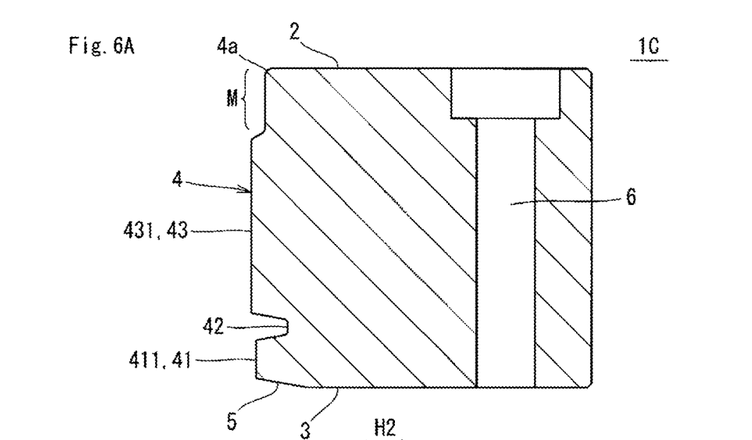
FIG. 6A is a sectional view of the caulking die shown in FIG. 5, taken along line C-C in FIG. 5C.
Figure 6B:
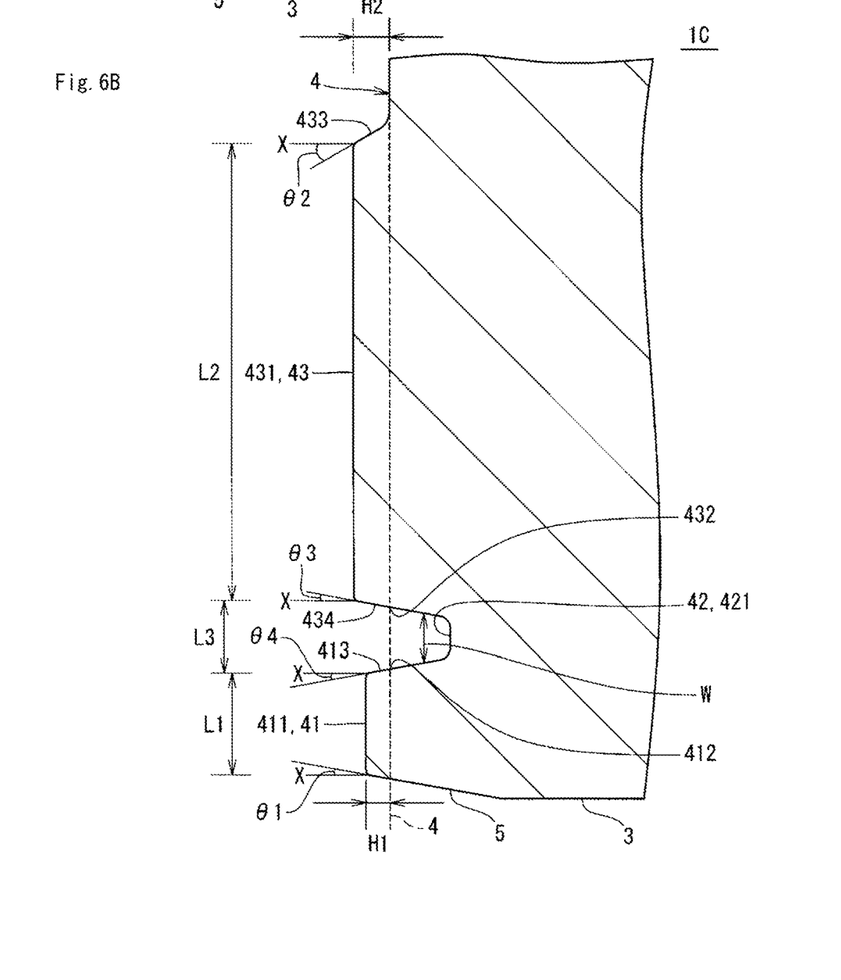
FIG. 6B is a partial enlarged sectional view of FIG. 6A.

A die according to a third embodiment of the present invention is described in detail below with reference to FIGS. 5 and 6. In FIGS. 5 and 6, the same reference numerals have been used as in FIGS. 1 to 4 for the same components and, in some cases, descriptions thereof are omitted.

In the die 1C of the present embodiment shown in FIGS. 5 and 6, the length L1 of the first top portion 411 is larger than the length L3 between the first top portion 411 and the second top portion 431 in a cross-sectional view shown in FIG. 6B.

Other configurations are similar to those in the dies 1A and 1B respectively according to the first and second embodiments, and therefore descriptions thereof are omitted.

<Caulking Tool>

A caulking tool according to an embodiment of the present invention is described in detail below with reference to FIG. 7 by taking, as an example, the case of including the die 1A according to the first embodiment.

As shown in FIG. 7, the caulking tool 20 of the present embodiment includes a plurality of dies 1A and a main body 100 configured to attach the dies 1A thereto.

The number of the dies 1A being attached to the main body 100 is eight in the present embodiment. Therefore, the caulking tool 20 is manufacturable by subjecting a caulking joint 200 described later to caulking in the eight directions.

Each of these dies 1A is attached to the main body 100 in a state of being capable of moving the end surface 4 in a caulking direction "b". The term "caulking direction "b"" denotes a direction to caulk the socket 202. The end surface 4 of each of the dies 1A has the inward protruding circular arc form in the top view as described above. Hence, when the dies 1A are moved in the caulking direction "b" to bring a state shown in FIG. 7A into a caulked state shown in FIG. 7B, an approximately cylindrical shaped region S having a predetermined inner diameter (caulking diameter) is formed by the end surfaces 4 of the eight dies 1A. Subsequently, when the socket 202 is set at a position at which the region S is formed, the socket 202 can be externally caulked by the eight dies 1A in the eight directions.

Although the description has been given of the case where the caulking tool 20 includes the dies 1A in the present embodiment, the case of including the dies 1B or 1C instead of the dies 1A is also capable of producing similar effects.

<Method for Manufacturing Caulking Joint>

A method for manufacturing a caulking joint according to an embodiment of the present invention is described in detail below with reference to FIG. 8 by taking, as an example, the case of using the caulking tool 20 according to the embodiment described above.

Figure 8A:
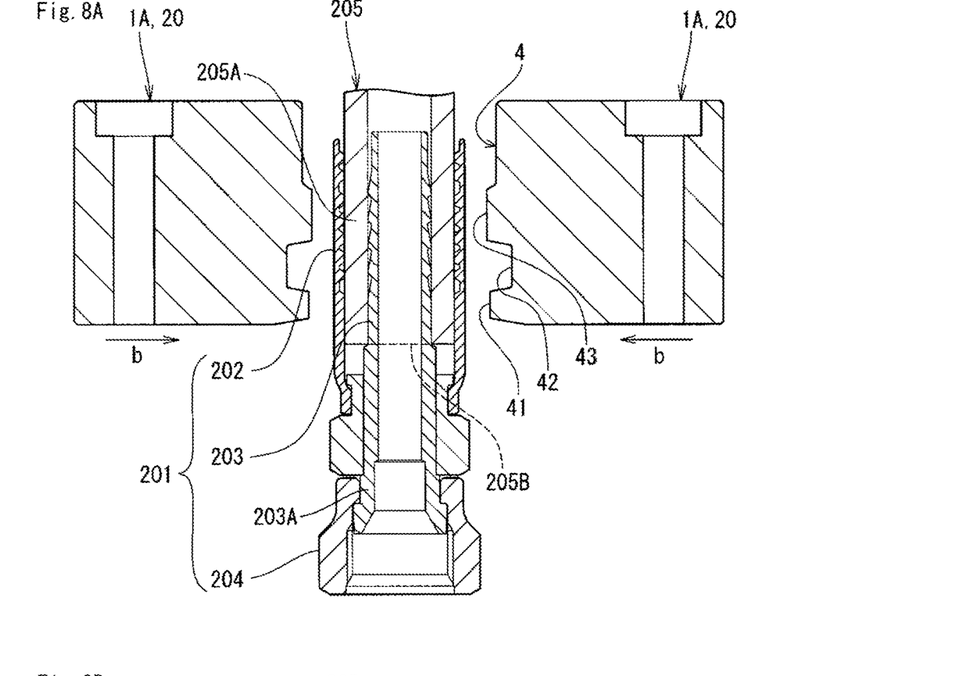
FIGS. 8A and 8B are explanatory schematic sectional views that show a method for manufacturing a caulking joint according to an embodiment of the present invention.
Figure 8B:
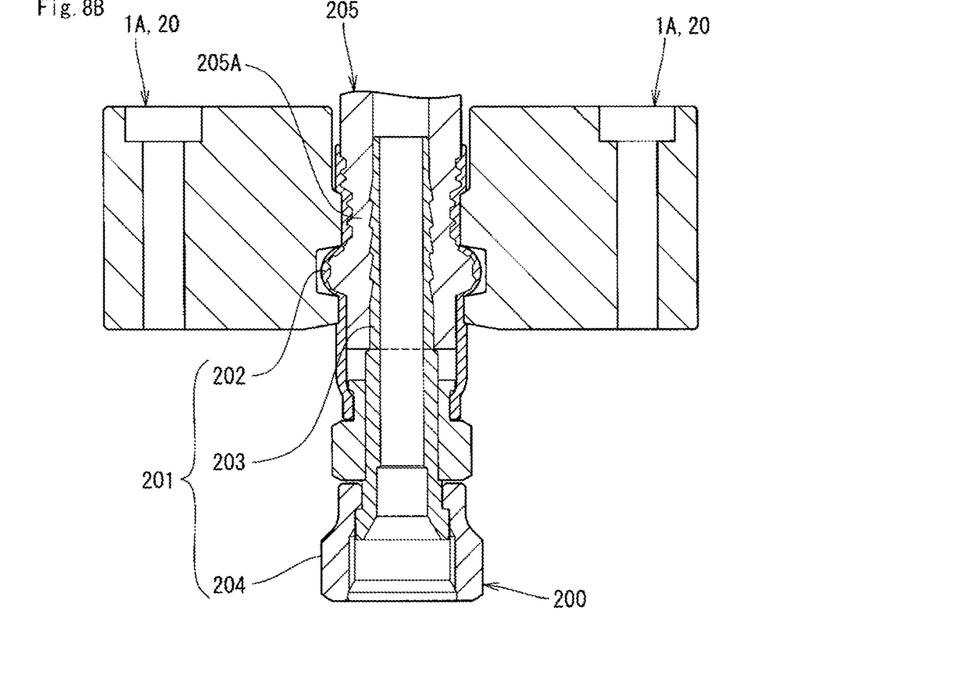

The method for manufacturing the caulking joint according to the present embodiment includes the following steps (i) and (ii):

(i) overlapping the tubular socket (ferrule) 202 of a joint part 201 onto one end portion 205A of the hose 205, and then inserting the nipple 203 of the joint part 201 from the hose aperture 205B at the one end portion 205A of the hose 205 into the hose 205 as shown in FIG. 8A; and (ii) caulk-fixing the one end portion 205A of the hose 205 to the nipple 203 by externally caulking the socket 202 by the caulking tool 201 as shown in FIG. 8B.

To be specific, the joint part 201 in the step (i) includes the socket 202 and the nipple 203. The socket 202 is a caulking member and generally made of metal. The nipple 203 is a component that seals a fluid and inhibits the hose slippage. The joint part 201 further includes a nut 204 being attached to a basal end part 203A of the nipple 203. The nut 204 is a component that functions as an attachment portion with respect to hydraulic machinery. However, it is not intended to limit the configuration of the joint part 201 to one provided with the nut 204.

The caulking joint 200 is obtainable through the step (ii). The amount of deformation of the nipple when manufacturing the caulking joint for high pressure is small because the present embodiment employs the caulking tool 20 including the dies 1A. Hence, though the obtainable caulking joint 200 is intended for high pressure, the amount of deformation of the nipple is small, and the caulking tool 20 is capable of exerting excellent sealing properties or the like.

In the step (ii) in the present embodiment, the socket 202 is externally caulked by the caulking tool 20 in a state in which the first protruded part 41 of the die 1A is located closer to the hose aperture 205B than the second protruded part 43. In other words, the socket 202 is externally caulked by the caulking tool 20 in a state in which the first protruded part 41 of the die 1A is located closer to the nut 204 than the second protruded part 43. With this configuration, there is a tendency that the load exerted on the nipple 203 when manufacturing the caulking joint for high pressure is further reduced, thereby reducing the amount of deformation of the nipple.

The obtainable caulking joint 200 is suitably usable as, for example, a piping joint used for hydraulic machinery or the like. However, the caulking joint 200 is not intended only for the hydraulic machinery, but is suitably usable as joints in the fields which need to be durable under high pressure.

Although the present invention is described in detail below by exemplifying examples, the present invention is not limited only to the following examples.

Examples 1 to 3

Caulking joints were respectively manufactured by using the two-stage caulking dies 1A to 1C according to the first to third embodiments.

<Configuration of Die 1A>
  Height H1 of the first protruded part: 1.0 mm
  Height H2 of the second protruded part: 1.5 mm
  Length L1 of the first top portion: 3.5 mm
  Length L2 of the second top portion: 11.0 mm
  Length L3 between the first top portion and the second top portion: 4.0 mm
  Caulking width: 14.5 mm
  Caulking rate: 27-32%
  Others: The configurations other than those described above are as shown in FIGS. 1 and 2.

<Configuration of Die 1B>
  Height H1 of the first protruded part: 1.0 mm
  Height H2 of the second protruded part: 1.5 mm
  Length L1 of the first top portion: 4.2 mm
  Length L2 of the second top portion: 8.0 mm
  Length L3 between the first top portion and the second top portion: 8.0 mm
  Caulking width: 12.2 mm
  Caulking rate: 37-43%
  Others: The configurations other than those described above were as shown in FIGS. 3 and 4.

<Configuration of Die 1C>
  Height H1 of the first protruded part: 1.0 mm
  Height H2 of the second protruded part: 1.5 mm
  Length L1 of the first top portion: 4.2 mm
  Length L2 of the second top portion: 19.0 mm
  Length L3 between the first top portion and the second top portion: 3.0 mm
  Caulking width: 23.2 mm
  Caulking rate: 32-39%
  Others: The configurations other than those described above were as shown in FIGS. 5 and 6.

The caulking width and the caulking rate of the dies 1A to 1C were designed values.

The following hoses were used for manufacturing the caulking joints.

Hose A: "N3130-04" with a wall thickness of 3.2 mm, manufactured by NITTA Corporation
  Hose B: "N3130-06" with a wall thickness of 3.3 mm, manufactured by NITTA Corporation
  Hose C: "N3130-08" with a wall thickness of 3.8 mm, manufactured by NITTA Corporation The following joint parts were used for manufacturing the caulking joints.

Joint part A: "SE-PF-04" manufactured by NITTA Corporation, including a steel socket with a wall thickness of 1.7 mm, a nipple with an inner diameter of 3.9 mm and an outer diameter of 6.4 mm, and a nut Joint part B: "SE-PF-06" manufactured by NITTA Corporation, including a steel socket with a wall thickness of 1.7 mm, a nipple with an inner diameter of 6.8 mm and an outer diameter of 9.8 mm, and a nut Joint part C: "SE-PF-08" manufactured by NITTA Corporation, including a steel socket with a wall thickness of 1.7 mm, a nipple with an inner diameter of 10.0 mm and an outer diameter of 12.8 mm, and a nut The caulking joints were respectively manufactured by using the dies 1A to 1C, the hoses A to C, and the caulking parts A to C in combinations presented in Table 1. Specifically, firstly caulking tools capable of performing caulking in the eight directions were individually obtained by attaching eight pieces of each of the dies 1A to 1C to a main body in the state shown in FIG. 7. "FINN-Power MT043" manufactured by Lillbacka Powerco Oy was used as the main body.

Subsequently, the socket is overlapped onto one end portion of the hose, and the nipple was inserted from the hose aperture into the hose. The socket was externally caulked in the eight directions by the caulking tool, so that the one end portion of the hose was caulk-fixed to the nipple. Here, the caulking joint was manufactured by externally caulking the socket by the caulking tool in a state in which the first protruded part was located closer to the hose aperture than the second protruded part.

Then, the amount of deformation of the nipple, fracture pressure, impact pressure, and sealing properties of the manufactured caulking joints were evaluated. Their respective evaluation methods were as follows. The results were presented in Table 1.

<Amount of Deformation of Nipple>

The caulking rate was set to the following values when manufacturing the caulking joints.

Example 1: a maximum value of 32%
Example 2: a maximum value of 43%
Example 3: a maximum value of 39%

The amount of deformation (buckling) of the nipple in the manufactured caulking joints was measured. Specifically, the amount of deformation of the nipple was calculated by measuring the inner diameter of the nipple after caulking with a pin gauge, and applying a measured value to the following formula: (Inner diameter of the nipple before caulking)−(Inner diameter of the nipple after caulking). The measurement was conducted three times (n=3), and a mean value thereof was calculated.

<Fracture Pressure>

The caulking rate was set to the following values when manufacturing the caulking joints.

Example 1: a minimum value of 27%
Example 2: a minimum value of 37%
Example 3: a minimum value of 32%

A fluid was passed through the manufactured caulking joints under the following conditions.

Fluid: oil (equivalent to ISO VG 46)
Fluid temperature: 23° C.
Pressure increase rate
Example 1: 77.0 MPa/min
Example 2: 63.0 MPa/min
Example 3: 56.0 MPa/min In terms of fracture physical properties at room temperature, a pressure at which the caulking joint was fractured was measured as a facture pressure. The measurement was conducted three times (n=3), and a mean value thereof was calculated.

<Impact Pressure>

The caulking rate was set to the following values when manufacturing the caulking joints.

Example 1: a minimum value of 27%
Example 2: a minimum value of 37%
Example 3: a minimum value of 32%

The presence or absence of leakage was evaluated by passing a fluid through the manufactured caulking joints under the following conditions.

Fluid: oil (equivalent to ISO VG 46)
Fluid temperature: 100° C.
Pressure waveform: square wave
Impact cycle: 60 c.p.m
Impact pressure
Example 1: 24.4 MPa
Example 2: 20.0 MPa
Example 3: 17.5 MPa
Piping form: U-shape
Number of measurements: n=3
Evaluation criteria
Symbol "◯": No leakage occurred after conducting 400,000 times.
Symbol "x": Leakage occurred after conducting 400,000 times.

<Sealing Properties>

Example 2 was subjected to a sealing properties test. Specifically, the caulking rate was set to the following value when manufacturing the caulking joint.

Example 2: a maximum value of 43%

The manufactured caulking joint was subjected to aging. In the aging, such a temperature cycle that the caulking joint was allowed to stand still at 100° C. for 21 hours and then was allowed to stand still at 23° C. for 3 hours was taken as one cycle. The presence or absence of leakage was evaluated on a cycle basis by passing a fluid through the caulked joint under following conditions.

Fluid: water
Pressure: 31.5 MPa
measuring time: one minute
Number of measurements: n=3
Evaluation Criteria
Symbol "◯": No leakage occurred after five cycles.
Symbol "x": Leakage occurred after five cycles.

Comparative Examples 1 to 3

Figure 9A:
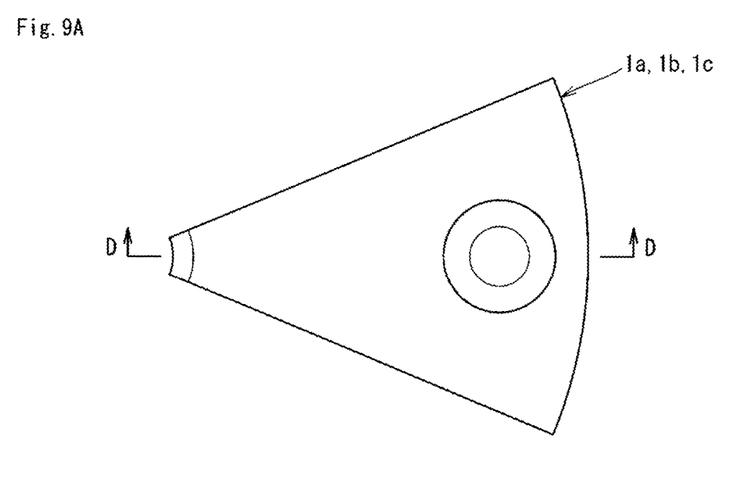
FIG. 9A is a plan view of a caulking die used in a comparative example.
Figure 9B:
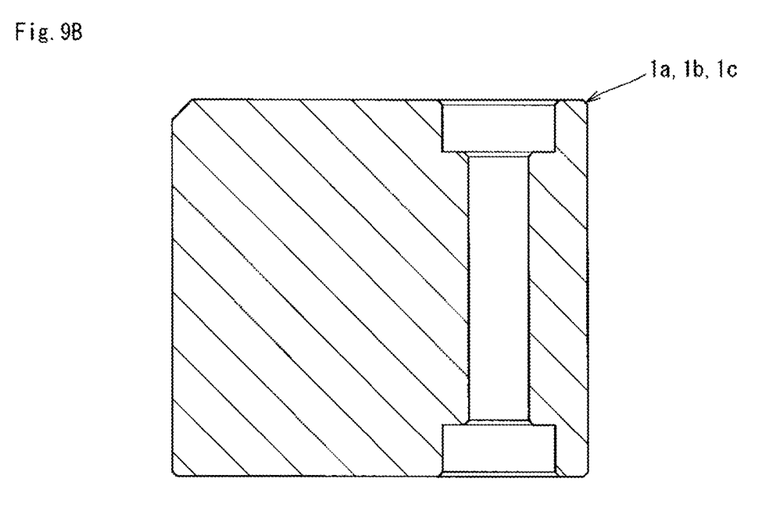
FIG. 9B is a sectional view taken along line D-D in FIG. 9A.

One-stage caulking dies 1a to 1c shown in FIG. 9 were respectively used instead of the two-stage caulking dies 1A to 1C. Specific configurations of the dies 1a to 1c were as follows.

<Configurations of Dies 1a to 1c>
Caulking Width
Die 1a: 24.0 mm
Die 1b: 26.0 mm
Die 1c: 31.0 mm
Caulking Rate
Die 1a: 22-31%
Die 1b: 29-39%
Die 1c: 26-35%

Figure 10A:
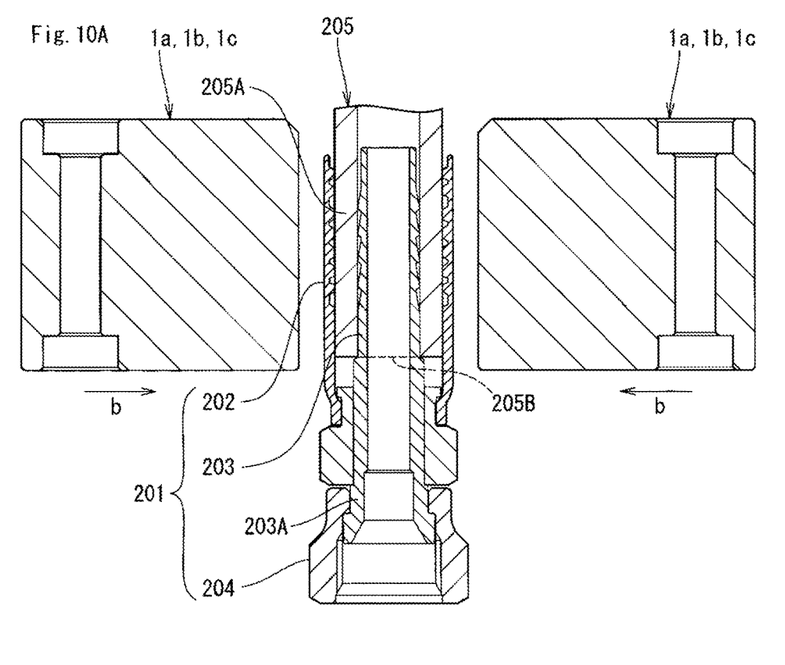
FIGS. 10A and 10B are explanatory schematic sectional views that show a method for manufacturing a caulking joint by using the caulking die shown in FIG. 9.
Figure 10B:
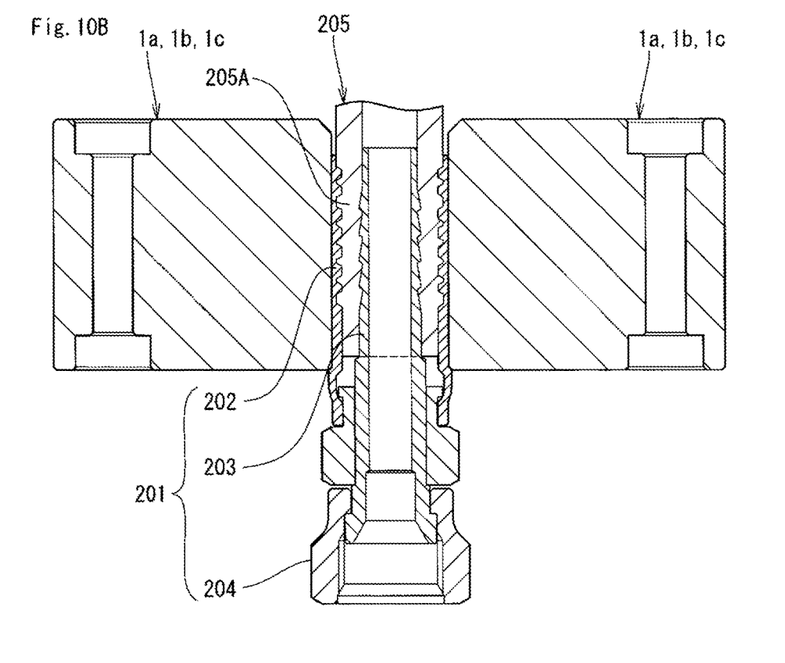

Caulking joints were manufactured in the same manner as in Examples 1 to 3 described above, except that the dies 1a to 1c, hoses A to C, and joint parts A to C were used in combinations presented in Table 1. A method for manufacturing the caulking joints respectively using the dies 1a to 1c is shown in FIG. 10. In FIG. 10, the same reference numerals have been used as in FIGS. 1 to 9 for the same components.

The manufactured caulking joints were evaluated in the same manner as in Examples 1 to 3, except that the amount of deformation of the nipple was measured two times (n=2). Specifically, Comparative 1 was evaluated similarly to Example 1, Comparative Example 2 was evaluated similarly to Example 2, and Comparative Example was evaluated similarly to Example 3. The results were presented in Table 1.

TABLE 1

| | Die | | | | Amount of deformation | Fracture | | |
|---|---|---|---|---|---|---|---|---|
| | Type | Caulking Width (mm) | Caulking Rate (%) | Hose Type | Joint Part Type | of nipple (mm) | Pressure (MPa) | Impact Pressure | Sealing Properties |
| Example 1 | 1A | 14.5 | 27~32 | A | A | 0.208 | 86.2 | ○ | — |
| Comparative Example 1 | 1a | 24.0 | 22~31 | A | A | 0.663 | 86.0 | ○ | — |
| Example 2 | 1B | 12.2 | 37~43 | B | B | 0.117 | 64.5 | ○ | ○ |
| Comparative Example 2 | 1b | 26.0 | 29~39 | B | B | 1.038 | 64.3 | ○ | x |
| Example 3 | 1C | 23.2 | 32~39 | C | C | 1.025 | 63.3 | ○ | — |
| Comparative Example 3 | 1c | 31.0 | 26~35 | C | C | 1.225 | 62.2 | ○ | — |

When comparison is made between Example 1 and comparative Example 1, between Example 2 an Comparative Example 2, and between Example 3 and Comparative Example 3, all of Examples 1 to 3 have a smaller amount of deformation of the nipple than their corresponding Comparative Examples 1 to 3. This shows that the caulking joints for high pressure having excellent joint physical properties were obtained in Examples 1 to 3. Of Examples 1 to 3, Examples 1 and 2, in which the length L1 of the first top portion is smaller than the length L3 between the first top portion and the second top portion, showed the result that the amount of deformation of the nipple was further reduced. Example 2, in which the length of the second top portion L2 is identical with the length L3 between the first top portion and the second top portion, showed the result that the amount of deformation of the nipple was particularly reduced. In the evaluation of sealing properties, Comparative Example 2 caused leakage after one cycle.

DESCRIPTION OF THE REFERENCE NUMERAL

1A: caulking die
1B: caulking die
1C: caulking die
2: upper surface
3: lower surface
4: end surface
41: first protruded part
411: first top portion
412: basal end portion
413: first upper wall portion
42: recessed groove
421: bottom part
43: second protruded part
431: second top portion
432: basal end portion
433: second upper wall portion
434: second lower wall portion
4a: upper end
5: inclined part
6: through hole
20: caulking tool
100: main body
200: caulking joint
201: joint part
202: socket
203: nipple
203A: basal end portion
204: nut
205: hose
205A: one end portion
205B: hose aperture

The invention claimed is:

1. A caulking die, comprising:
an upper surface;
a lower surface;
a through hole extending between the upper surface and the lower surface; and
an end surface being connected to each of the upper surface and the lower surface,
wherein the end surface comprises a first protruded part including a first top portion, a recessed groove, and a second protruded part including a second top portion in sequential order from the lower surface toward the upper surface,
wherein the first protruded part, the recessed groove, and the second protruded part extend along a width direction of the end surface,
wherein a length of the second top portion is larger than a length of the first top portion, and a height of the second protruded part on a basis of the end surface is greater than a height of the first protruded part on the basis of the end surface in a cross-sectional view perpendicular to the width direction,
wherein the first protruded part includes a first upper wall portion located close to the upper surface in the cross-sectional view and the second protruded part includes a second lower wall portion located close to the lower surface in the cross-sectional view, and
wherein an inclination angle of the first upper wall portion is identical with an inclination angle of the second lower wall portion in the cross-sectional view such that the first upper wall portion and the second lower wall portion continuously extend to the recessed groove according to the inclination angles.

2. The caulking die according to claim 1, wherein the first protruded part has a trapezoidal form in the cross-sectional view.

3. The caulking die according to claim 1, wherein the length of the first top portion is smaller than a length between the first top portion and the second top portion in the cross-sectional view.

4. The caulking die according to claim 1, further comprising an inclined part located from the first top portion to a part of the lower surface.

5. The caulking die according to claim 4, wherein an inclination angle of the inclined part is an acute angle.

6. The caulking die according to claim 1, wherein the recess groove is continuous with each of a basal end portion of the first protruded part and a basal end portion of the second protruded part.

7. The caulking die according to claim 1, wherein a groove width of the recessed groove decreases toward a bottom part of the recessed groove.

8. The caulking die according to claim 1, wherein the second protruded part has a trapezoidal form in the cross-sectional view.

9. The caulking die according to claim 1, wherein the second protruded part is located away from an upper end of the end surface located close to the upper surface by interposing a clearance between the second protruded part and the upper end.

10. The caulking die according to claim 1,
wherein the second protruded part has a trapezoidal form and comprises a second upper wall portion located close to the upper surface, and
wherein an inclination angle of the second upper wall portion is larger than the inclination angle of the second lower wall portion in the cross-sectional view.

11. The caulking die according to claim 1, wherein a length of the second top portion is identical with a length between the first top portion and the second top portion in the cross-sectional view.

12. The caulking die according to claim 1, wherein the first top portion and the second top portion have a planar form.

13. The caulking die according to claim 1, wherein the end surface has an inward protruding circular arc form in a top view.

14. A caulking tool, comprising:
a plurality of the caulking dies according to claim 1; and
a main body configured to attach the caulking dies thereto,
wherein each of the caulking dies is attached to the main body in a state of being capable of moving the end surface in a caulking direction.

15. The caulking tool according to claim 14, wherein a number of the caulking dies is eight.

16. A method for manufacturing a caulking joint, comprising:
overlapping a tubular socket of a joint part onto one end portion of a hose, and then inserting a nipple of the joint part from a hose aperture at the one end portion of the hose into the hose; and
caulk-fixing the one end portion of the hose to the nipple by externally caulking the socket by the caulking tool according to claim 14.

17. The method for manufacturing a caulking joint according to claim 16, comprising externally caulking the socket by the caulking tool in a state in which the first protruded part is located closer to the hose aperture than the second protruded part.

18. The caulking tool of claim 14, wherein the upper surfaces and the lower surfaces of the plurality of caulking dies are in contact with each other.

* * * * *